United States Patent [19]
Vanderpool et al.

[11] Patent Number: 5,781,773
[45] Date of Patent: Jul. 14, 1998

[54] METHOD FOR TRANSFORMING AND STORING DATA FOR SEARCH AND DISPLAY AND A SEARCHING SYSTEM UTILIZED THEREWITH

[75] Inventors: Thomas R. Vanderpool, White Bear Township, County of Ramsey, Minn.; Craig K. Lenz, Menomonie, Wis.; TJ Parro, Woodbury, Minn.; John D. Threlfall, Pine Springs, Minn.; Brian T. Vanderpool, White Bear Township, County of Ramsey, Minn.

[73] Assignee: Minnesota Mining and Manufacturing Company, St. Paul, Minn.

[21] Appl. No.: 916,868

[22] Filed: Aug. 22, 1997

Related U.S. Application Data

[63] Continuation of Ser. No. 438,342, May 10, 1995, abandoned.

[51] Int. Cl.⁶ .................................................. G06F 17/30
[52] U.S. Cl. .................................... 395/611; 395/613
[58] Field of Search ................................. 395/601, 611, 395/612, 613, 614, 615, 616; 345/334, 335, 336, 339, 340

[56] References Cited

U.S. PATENT DOCUMENTS

| | | | |
|---|---|---|---|
| 4,429,385 | 1/1984 | Cichelli et al. | 370/92 |
| 4,829,453 | 5/1989 | Katsuta et al. | 364/521 |
| 4,870,576 | 9/1989 | Tornetta | 364/401 |
| 4,905,163 | 2/1990 | Garber et al. | 364/513 |
| 5,032,989 | 7/1991 | Tornetta | 364/401 |
| 5,146,548 | 9/1992 | Bijnagte | 395/117 |
| 5,235,680 | 8/1993 | Bijnagte | 395/161 |
| 5,241,671 | 8/1993 | Reed et al. | 395/600 |
| 5,265,246 | 11/1993 | Li et al. | 395/600 |
| 5,325,297 | 6/1994 | Bird et al. | 364/419.07 |

FOREIGN PATENT DOCUMENTS

| | | |
|---|---|---|
| 0 460 869 A3 | 12/1991 | European Pat. Off. |
| WO 95/12176 | 5/1995 | WIPO |

OTHER PUBLICATIONS

Top Producer® 5.1 for Windows, User's Guide 1994 Top Producer Systems, Inc.
Quick Time for Windows, Chapter 3—Image Compression Manager (Sep. 1993).
Product Literature, Top Producer® For Windows—Simply the Best Real Estate Sales and Marketing Software, Top Producer Systems Inc. (from real estate trade show Apr. 1994).
Product Literature, On–Line Software, Inc.—The standard in Real Estate Software (from real estate trade show Apr. 1994).
Product Literature, HomeScope™ Multiple listings on CD–ROM, PRC Realty Systems, Inc. (Nov. 1994).
Product Literature, 3M MSDS Access System, A Cost–Effective Distribution of Material Safety Data Sheet Information on CD–ROM (1995) (Product available prior to 1994).
Product Literature, 3M CD Stock—Stock Photography on CD, 3M Imaging (1993).
Article, "Digital Photo catalogs Transform Creative Process," Computer artist, (Oct./Nov. 1994).

Primary Examiner—Thomas G. Black
Assistant Examiner—Ruay Lian Ho
Attorney, Agent, or Firm—Mark J. Gebhardt

[57] ABSTRACT

A method of transforming and storing data for search and display by a computer system includes formatting and aligning data records of a plurality of objects to a common table mapped format. The formatted and aligned data records are merged and a database is generated therefrom. The database is stored on an optical disc and includes index tables corresponding to searchable data fields. Image data for the objects is compressed and a main compressed image and an image of lesser resolution are randomly stored to a plurality of storage subdirectories on an optical disc. A program for searching and further processing the stored data is also stored on the optical disc with the database and the storage subdirectories. The program for search and display of the data uses an index bar interface for searching the indexed tables. The objects may include real estate properties.

37 Claims, 14 Drawing Sheets

METHOD FOR TRANSFORMING AND STORING DATA FOR SEARCH AND DISPLAY AND A SEARCHING SYSTEM UTILIZED THEREWITH

This is a continuation of application Ser. No. 08/438,342, filed 10 May 1995 and now abandoned.

The present invention generally relates to the transformation and storage of data associated with objects for search and display thereof. In particular, the present invention relates to the transformation and storage of textual and image data, for example, data relating to real estate properties, for search and display of such data. The invention further relates to a searching system for use with such transformed and stored data.

BACKGROUND OF THE INVENTION

Certain subject matter is best represented by a combination of images and textual data, which includes numeric data. In many circumstances it is desirable to search such textual data and images representative of a large number of varying objects, no matter in what form this textual data and images are stored, to locate particular objects of the subject matter which meet a set of desired criteria. For example, one may wish to search a catalog for a piece of clothing which has an attractive pictorial representation and for which text indicates a desirable fabric and cost. Further, for example, buyers of real estate property may find it desirable to search through multiple images and textual data, such as tax data, with regard to various real estate properties, to choose a subset of properties to physically visit.

Real estate property, particularly residential property, is sold through the use of "multiple listing service" (MLS) real estate books. Such books usually contain listings of real estate properties for sale in a given geographical area. Real estate agents utilize such MLS books to obtain a subset of properties meeting select criteria of potential buyers. Such books reflect the properties currently on the market and must therefore be printed relatively often, for example, once a week. Procedures used in publishing such MLS books having images and textual data for various real estate properties, have been described, for example, in U.S. Pat. No. 5,146,548 to Bijnagte, entitled "Method and Apparatus For Optimizing and Storing Contone Images for Subsequent Half-toning and Merging with Text." However, such MLS books cannot be automatically searched by the real estate agents to locate properties which meet the select criteria of their potential clients.

Computerized systems have been described for searching MLS textual data and images. Such computerized systems include systems at local sites which retrieve information concerning various properties via a communications link from a host site where the information is stored, commonly referred to as an on-line system. Others systems have been described which are entirely at a local site and obtain information from a local storage media, for example a compact disc read only memory (CD-ROM).

Previously described on-site computerized systems, with which the present invention is concerned, appear to provide on-site searchable MLS data to users. However, such systems appear to lack flexibility, speed and efficiency with respect to the manner in which the textual data and images are formatted and stored for use by a computer-implemented searching system. This tends to increase the time necessary to provide the user with updated stored information and as such current updated data may not always be available. For example, with respect to MLS book data, such data must be updated frequently as mentioned above because of the constant sale of property. In addition, speed and efficiency with respect to the search and display of information from the stored data also appears lacking in presently described systems. Without a quick response to search queries, a user wastes an enormous amount of time performing searches. The present invention has advantages over present systems as will become apparent and better understood by reading the following detailed description of the present invention.

SUMMARY OF THE INVENTION

The present invention describes a method of transforming and storing data for search and display by a computer system, and also a computer implemented data searching system and method. The method of transforming and storing data for search and display thereof includes providing image data for a plurality of objects with each object associated with a corresponding identifier of a plurality of identifiers. At least one group of textual data records for the plurality of objects associated with corresponding identifiers is also provided with each group of textual data records including data records having a same or different table mapped format. The data records of each group of textual data records is formatted and aligned to a common table mapped format corresponding to each group of textual data records. The formatted and aligned data records of the at least one group of textual data records are merged into a merged data file and a database is generated therefrom. The database is stored on a master optical disc and has a textual file for each object, the textual file including a plurality of data fields and being associated with a corresponding identifier. The database further includes a plurality of index tables at least in part corresponding to searchable data fields of the plurality of data fields of the textual files. The image data for each of the plurality of objects is compressed resulting in at least one compressed image for each object, if an image for the object is available, and the at least one compressed image for each object is stored to the master optical disc as a function of the identifier. A program for manipulating the stored image data and textual data is also stored on the master optical disc with the database and images. The master optical disc is replicable for distribution.

In another embodiment, the method also includes decompressing and recompressing a compressed image for each object resulting in a lesser resolution compressed image for each object. The lesser resolution compressed image and the at least one compressed image are randomly stored to a plurality of storage subdirectories on the master optical disc as a function of the identifiers.

The method for search and display of data using a computer with an optical media read apparatus for communication with the computer includes providing a database stored on optical media which is accessible utilizing the computer. The database includes a plurality of textual files corresponding to a plurality of objects and each textual file has a plurality of text fields and is associated with an identifier corresponding to one of the plurality of objects. The database has indexed tables at least in part corresponding to searchable data fields of the plurality of text fields. Compressed image data for each object of the plurality of objects is provided and stored on the optical media as a function of the identifier. The compressed image data includes at least a first compressed image and a second compressed image of lesser resolution than the first compressed image. An interface is displayed for at least one searchable data field of the plurality of text fields. Each interface allows a user to define a search query for a search parameter corresponding to one of the searchable data fields. The indexed table corresponding to the search parameter is searched for objects satisfying the search query and a table of references to the optical media indicating the position of textual and image data for objects resulting from the searching step is generated. The interface displays a count of objects resulting from the searching step and the second compressed image and certain summary data fields of the textual file for each object resulting from the searching step using the table of references are retrieved. The second compressed image is decompressed and displayed with the certain summary data fields for at least two of the objects resulting from the searching step.

In another embodiment of this method, one of the at least two objects is selected and a substantial number of the data fields of the textual file and the first compressed image of the selected object are retrieved. The first compressed image of the selected object is decompressed and displayed with the substantial number of data fields of the textual file.

A computer implemented data searching system with a computer having a processor and a table-driven program for searching, retrieving and displaying textual and image data on a display of the computer is also described. An optical media read device is connected to the computer for communication with the processor thereof and optical storage media is operable with the optical media read device under control of the computer and table-driven program. The optical storage media stores a database including a plurality of textual files corresponding to a plurality of objects. Each textual file has a plurality of text fields and is associated with an identifier corresponding to one of the plurality of objects. The database further has indexed tables at least in part corresponding to searchable data fields of the plurality of text fields. The optical storage media further stores compressed image data for each object of the plurality of objects in a plurality of subdirectories as a function of the identifiers. The compressed image data includes at least a first compressed image and a second compressed image of lesser resolution than the first compressed image. The table-driven program carries out, at least in part, the search method as described above.

In other embodiments, the present invention is applied to the use of real estate property data and images.

BRIEF DESCRIPTION OF THE DRAWINGS

FIG. 10 is a diagram generally showing the search screen of FIG. 9;

FIG. 11 is a diagram generally showing the results screen of FIG. 9; and

DETAILED DESCRIPTION OF THE PREFERRED EMBODIMENT

Figure 1:
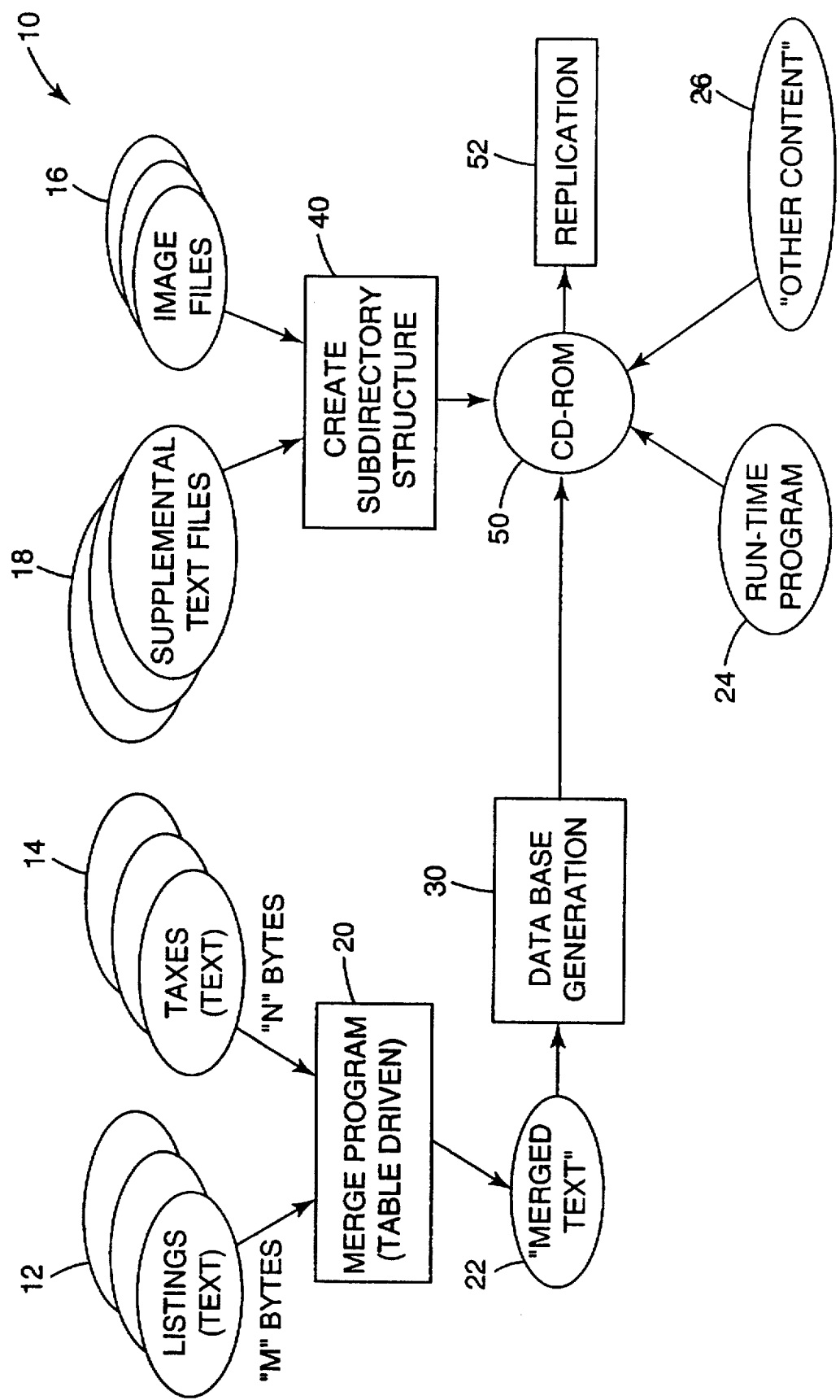
FIG. 1 is a diagram showing a compact disc formatting process in accordance with the present invention.

With reference to FIG. 1, a compact disc (CD) format process 10 in accordance with the present invention shall be generally described. After the compact disc format process 10 is described, search and display of data utilizing CD-ROMs replicated from the master CD-ROM 50 as generated from the CD format process 10 shall also be described. The CD formatting process 10 and the search and display process shall be described with particular emphasis placed on the use of the present invention with real estate property listing services, such as MLS, however, the formatting process and any computer-implemented systems utilizing such processes are equally applicable to other types of subject matter. For example, other types of subject matter may include sales catalog data, which includes both images and textual data. Any other subject matter wherein it is desirable to search textual data and images of a plurality of objects based on a qualified set of parameters may likewise benefit from the process and system described herein. Therefore, the present invention is not limited to merely being applicable to real estate properties and the scope of the invention is as defined in the accompanying claims.

In addition, storage media other than CD-ROM technology may also be used in conjunction with the present invention. Storage capacity of other medias, including other optical media, may provide the necessary characteristics, as will become apparent to one skilled in the art from the method and system described below, to be used in conjunction with the concepts described herein. Therefore, the present invention is not limited to CD-ROM technology and the scope of the invention is as defined in the accompanying claims.

Figure 8:
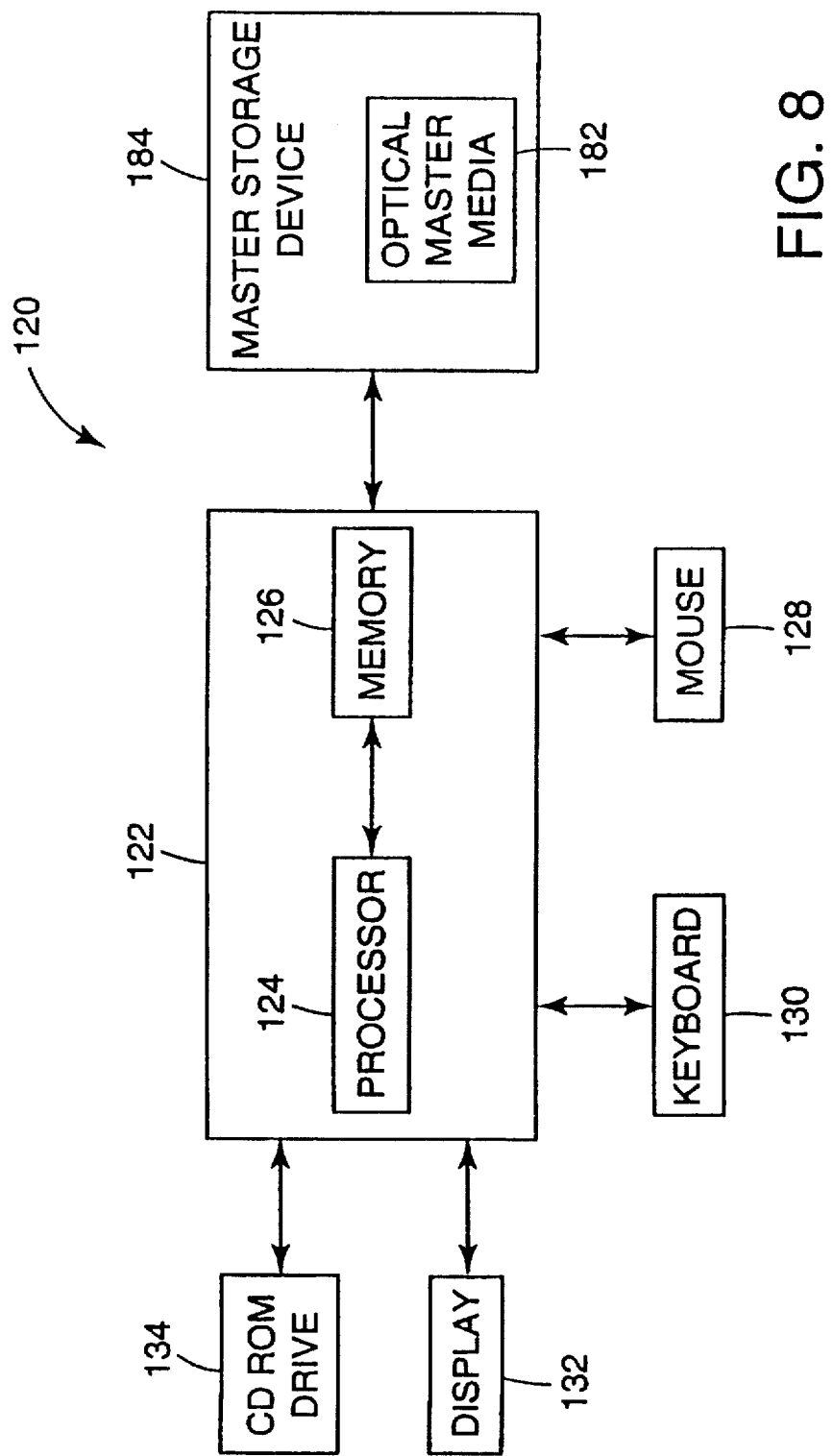
FIG. 8 is a computer system for use in the formatting process of FIG. 1 and search and display of data stored per the formatting process of FIG. 1.

The compact disc format process 10, as shown in FIG. 1, includes a table-driven merge program 20 for merging various groups of textual data records into a merged text file 22. Such groups of data records may include MLS data records 12, tax data records 14, or any other textual data records which contains information a user would desire to search. Database generation process is then applied to the merged text file 22 to generate a database for storage on master CD-ROM 50. Supplemental text files 18 and image files 16 are also stored on master CD-ROM 50 via a process for creating a subdirectory structure 40. In addition to the database, images, and supplemental text stored on master CD-ROM 50, a run-time program 24 and any other content necessary for search and display of information by a computer system, such as computer system 120 as shown in FIG. 8, are also stored on master CD-ROM 50. Master CD-ROM 50 is a master compact disc that can be replicated by a replication process 52 as is known in the art for generation of multiple distributable CD-ROMs. Such replicated CD-ROMs are then usable and searchable on-site by a user with a stand-alone computer system 120 having a CD-ROM drive 134 as shown in FIG. 8.

Figure 2A:
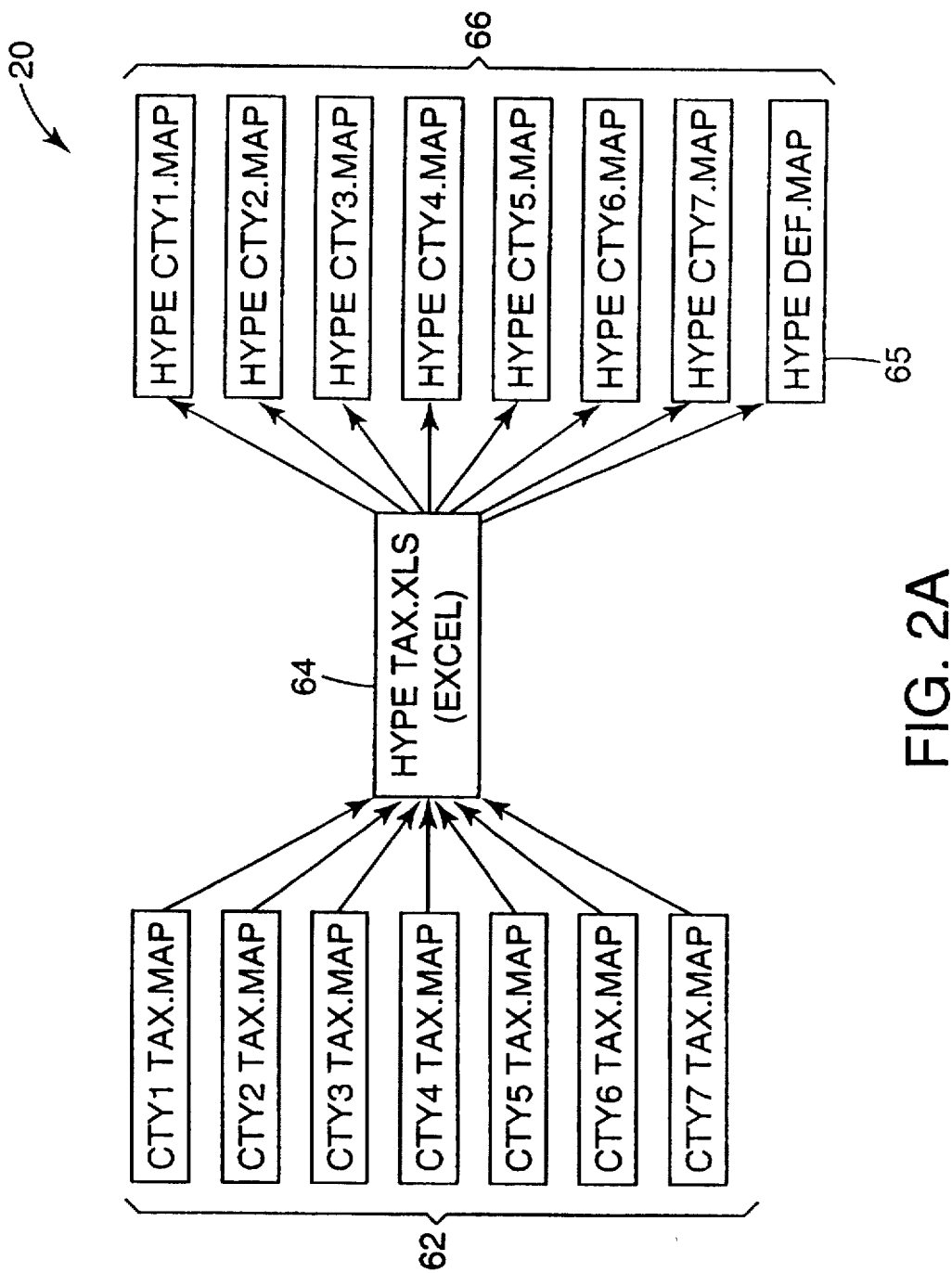
FIGS. 2A and 2B are diagrams showing the alignment of data record table maps to common formatted table maps for the formatting process of FIG. 1.

The formatting process 10 shall be described in further detail with reference to FIGS. 1 through 8. The table-driven merge program 20 shall be specifically described with reference to FIGS. 2A and 2B, FIGS. 3A and 3B, and FIG. 4. Multiple listing service (MLS) data records input to the table-driven merge program 20, may include data records having very different formatted data record maps. The 'map' files are tables that list the field name, start byte, end byte, and field length for each ASCII field in the sequential files input to the process. The data type is not limited to ASCII. Further, data conversion and justification are also included. Each multiple listing service real estate property may include well over a hundred such fields and there may be different property type maps 68 for different property types. In addition, each county may have a different tax record map 62 as shown in FIG. 2A. Further, as shown in FIG. 2A, in the embodiment described herein, there are seven different tax record maps 62, one for each different county, counties CTY1–CTY7 Likewise, there are eight different property type maps 68 for eight different property types, shown as PT1–PT8 in FIG. 2B. For example, PT1 refers to single family property. The present invention is not limited to any particular number of property types or maps, tax record maps, or any other number specified in illustrations set forth herein. Rather, one skilled in the art will recognize that the numbers of maps, data records, data fields or other properties specified herein are for illustration only and that the concepts described herein are applicable to multiple numerical combinations and are limited only as described in the accompanying claims.

In order to effectively search and display information with regard to various real estate properties, these various maps must be aligned to a common formatted map. The common formatted map is defined by the display format used for display of information upon searching thereof The search and display process shall be described in further detail below. A spreadsheet program 64, such as off-the-shelf spreadsheet Excel, commonly available from Microsoft, is utilized to define a common formatted map, such as definition maps 65 and property type maps 73. For example, the spreadsheet may select the largest field length necessary for a particular field across all 7 counties, resulting in a common formatted field. Procedures, like this would be used to align all the fields and to generated the common formatted maps. The definition map 65 would include the seven commonly formatted maps 66. Likewise, a spreadsheet program 64 such as Excel, is utilized to generate the property type definition maps 73, including the eight different commonly formatted property type maps 72. It should be readily apparent to one skilled in the art that a database program such as FoxPro™ or Access™, both available from Microsoft, may also be utilized to perform the task of defining a common formatted map.

Figure 2B:
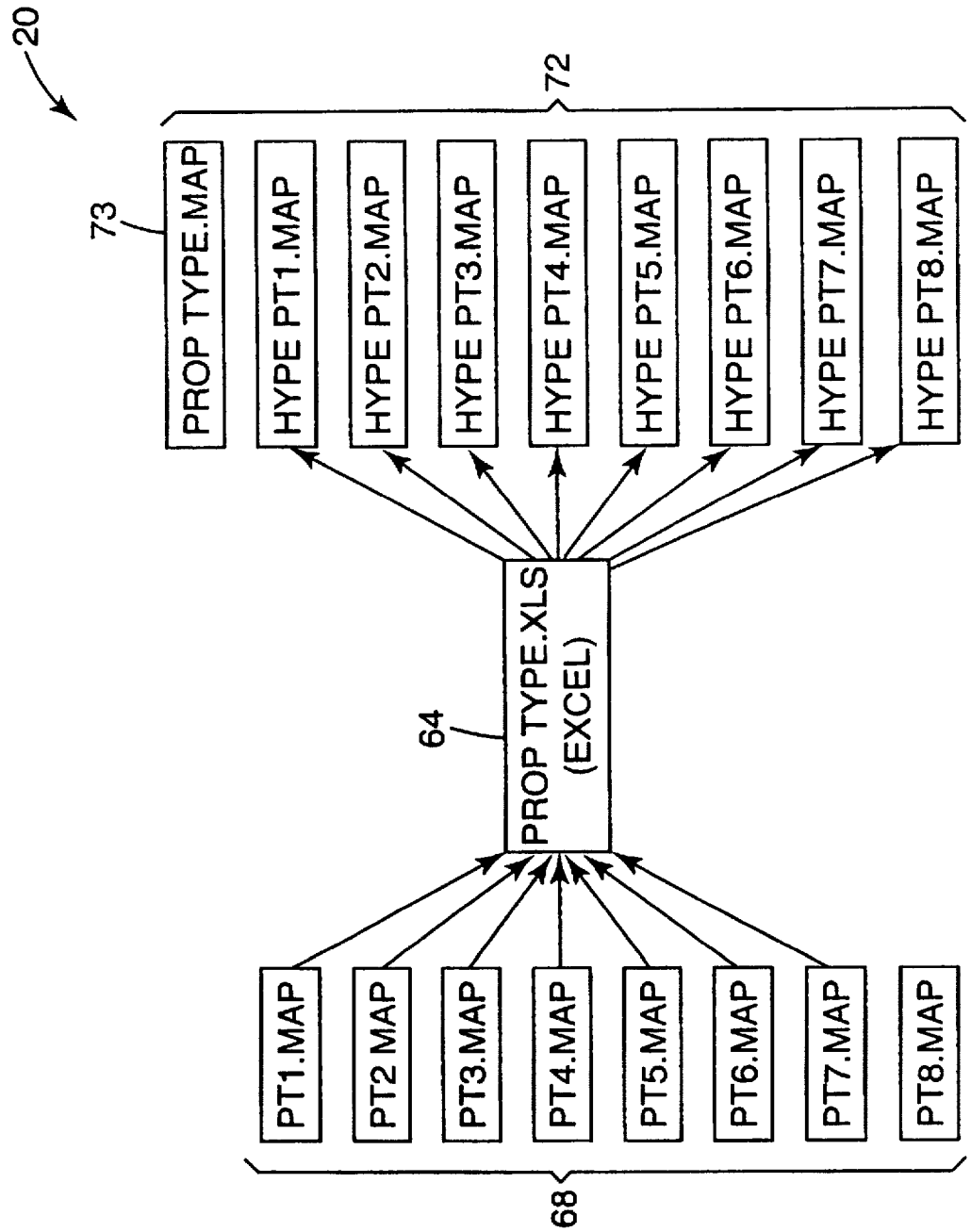
Figure 3A:
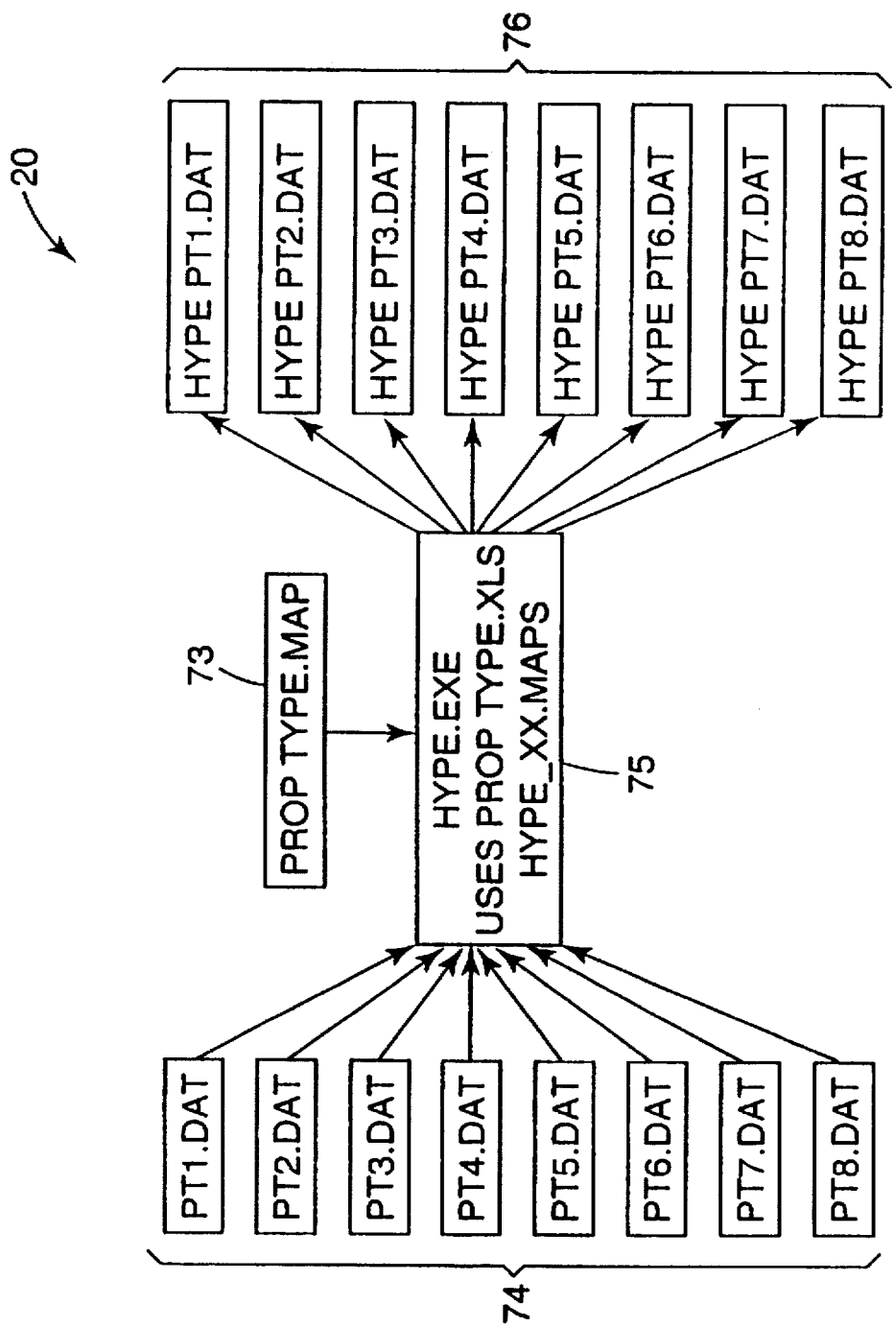
FIGS. 3A and 3B are diagrams of aligning data records to the common formatted table maps of FIG. 2A and 2B for the formatting process of FIG. 1.
Figure 3B:
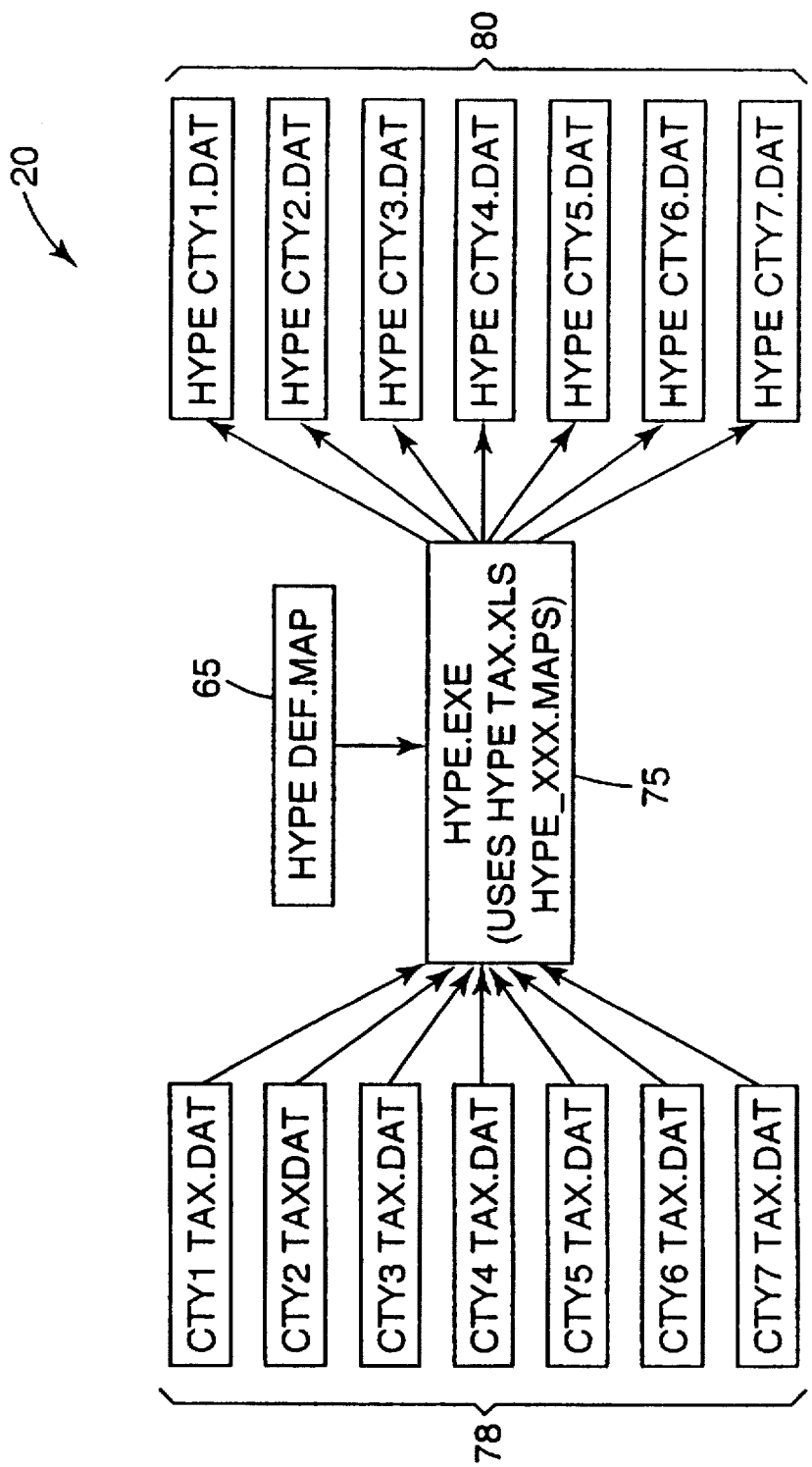

After the common formatted tax record maps and common formatted property type maps are generated as shown in FIGS. 2A and 2B, the property type data records 74, for all eight different property types PT1–PT8, provided in the previously varied mapped form are aligned to the commonly formatted property type maps 73, including property type maps 72, as generated per FIG. 2B. This process is shown in FIG. 3A. The property type data records 74 under the previous mapped format are aligned to the common formatted property type maps 73, including the various commonly formatted property type maps 72, per executable program 75 resulting in commonly formatted property type records 76. The commonly formatted definition maps 65, including the various common formatted tax record maps 66 as generated per FIG. 2A for the various counties CTY1–CTY7, are utilized to commonly align the tax data records 78 for the various counties CTY1–CTY7 via executable program 75. Tax data alignment is shown in FIG. 3B and the result of such alignment is commonly formatted tax data records 80 for the various counties CTY1–CTY7. The executable program 75 is table driven and, in particular, performs byte by byte alignment, data integrity checking, as well as generates an audit trail and further processable tables.

Figure 4:
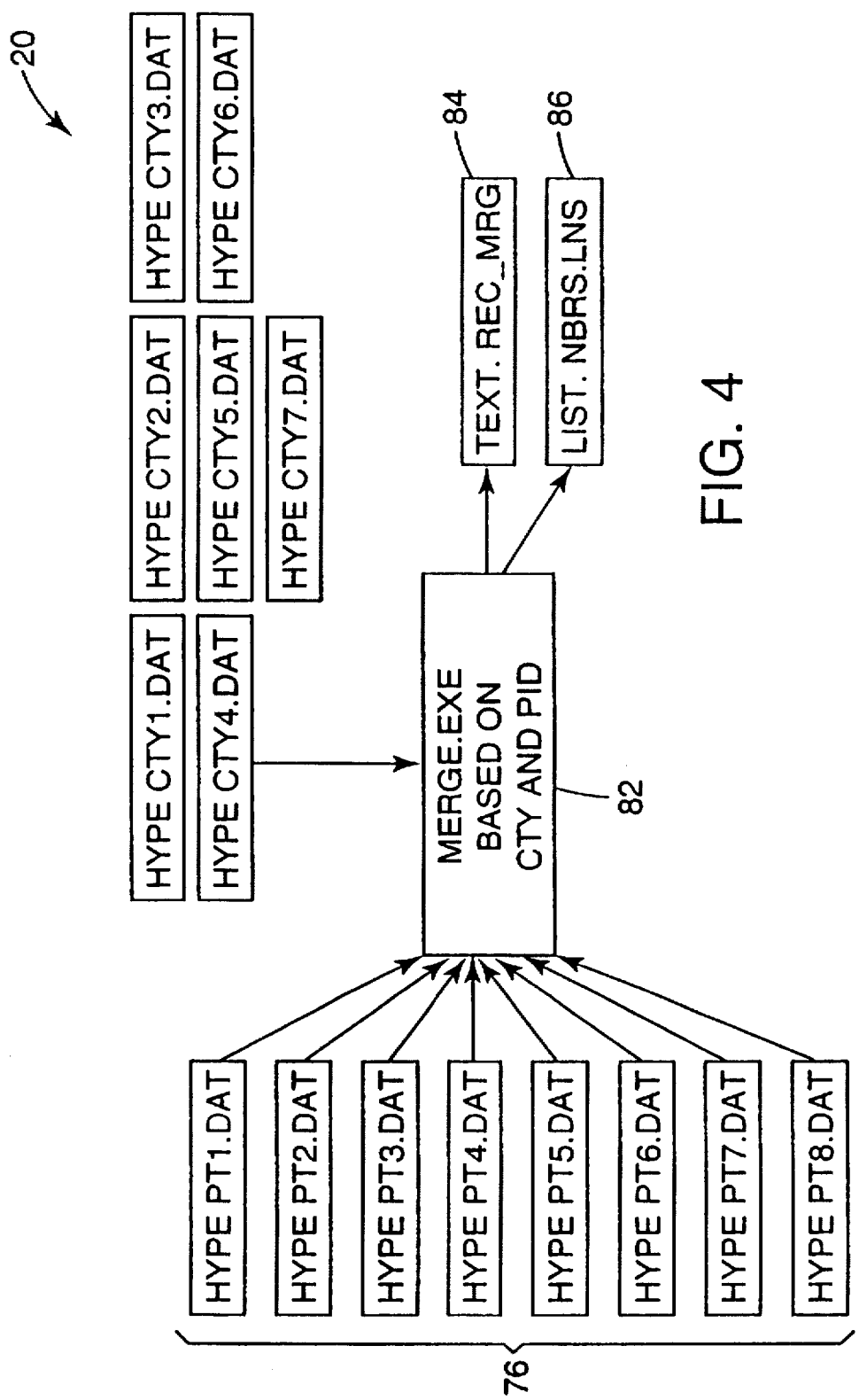
FIG. 4 is a diagram showing the merging process for the commonly formatted data in the formatting process of FIG. 1.

As shown in FIG. 4, with respect to the table driven merge program 20, the resulting commonly aligned property type data records 76 and the commonly aligned tax data records 80 are merged into a text record merge file 84 by executable program 82. The merge is performed based on common identifiers between the data records. In the embodiment described herein, the common identifier is both the county of the property and property identification number. The merge executable program 82 also generates a listing number file 86. The text record merge file 84 includes listing data representative of the properties listed in the geographical region. The properties listed each include a multiple listing service number or identifier and the listing number file 86 is a file including those listing numbers or identifiers. The text record merge file 84 also includes links and flags for auxiliary program features, supplemental text and images; digital sound and video; tax data for the listed properties, and postamble records for associated geographic data such as geographic codes for each property. The listing number file 86 provides for a 'quick reference' of property identifiers for use when generating the database as further described below. The merge executable program is a general purpose, table driven 'batch' text processor and, in particular, performs data consolidation, database integrity checking, as well as generates an audit trail and other auxiliary files such as 'key word'references.

Figure 5:
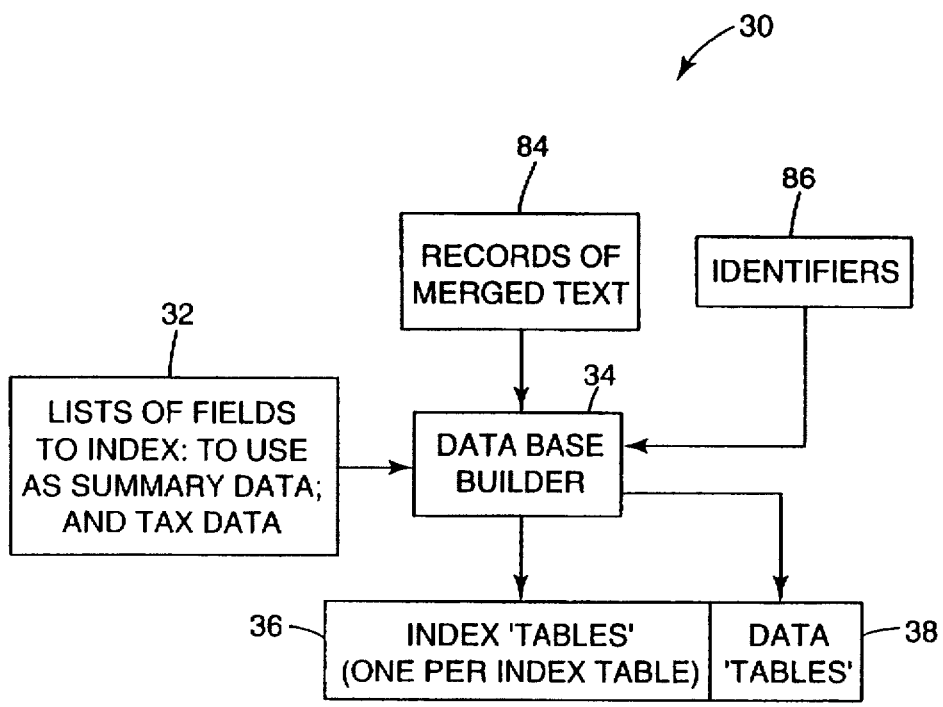
FIG. 5 is a diagram showing the database generation in the formatting process of FIG. 1.
Figure 6:
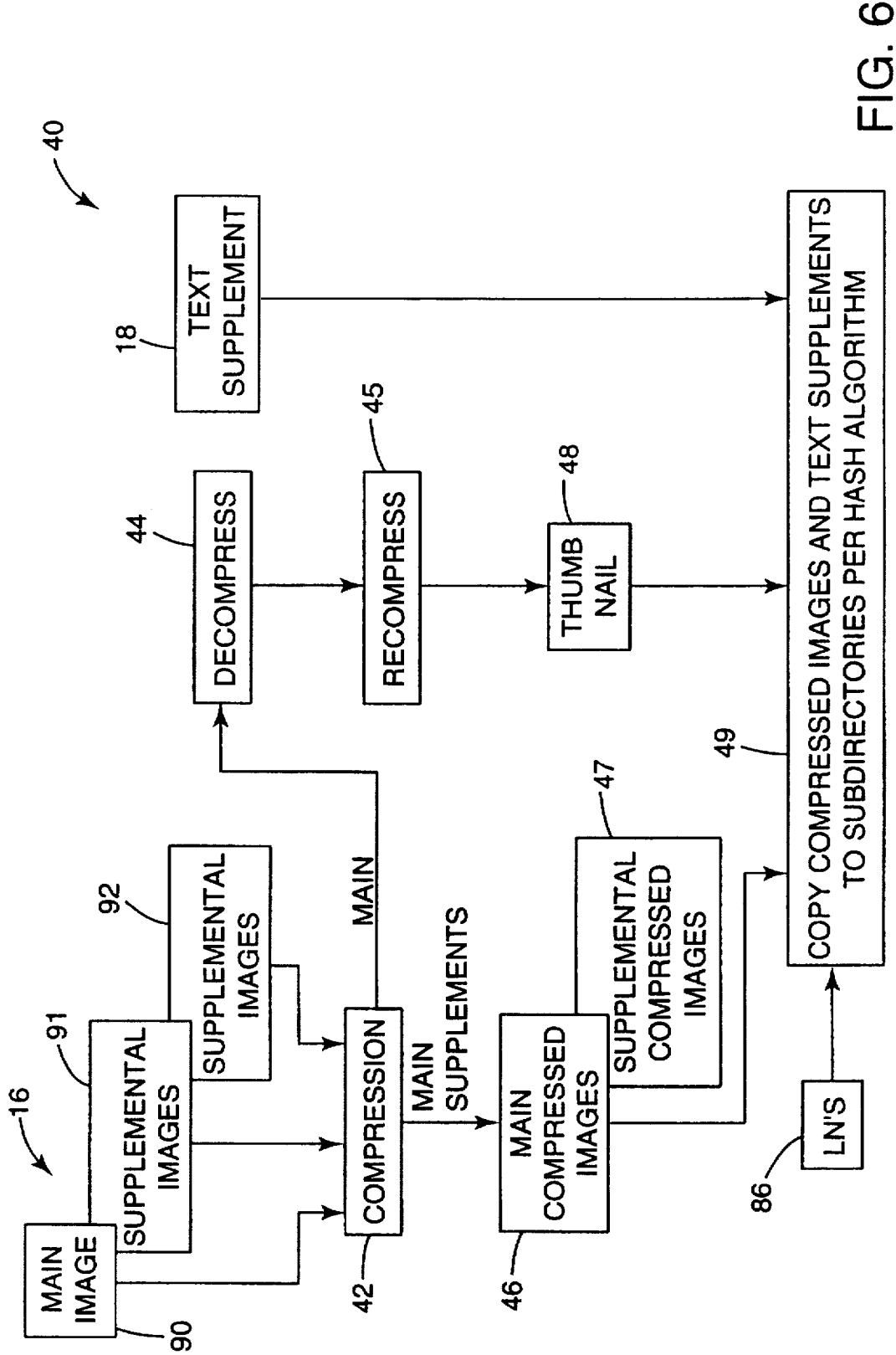
FIG. 6 is a diagram showing the creation of the subdirectory structure in the formatting process of FIG. 1.

The database generation process 30 shall further be described with reference to FIG. 5. The text record merge file 84 and listing number file 86 are applied to a database builder program 34. In addition, various user defined inputs 32 are provided to the database builder 34. Such user-defined inputs may include: lists of the fields of the various commonly formatted data which the database builder is to index in table form; list of fields to be used as summary data; and the data to be used as tax data. Such terms as 'summary data' shall become clearer from review of the description below with regard to the search and display process.

Figure 7:
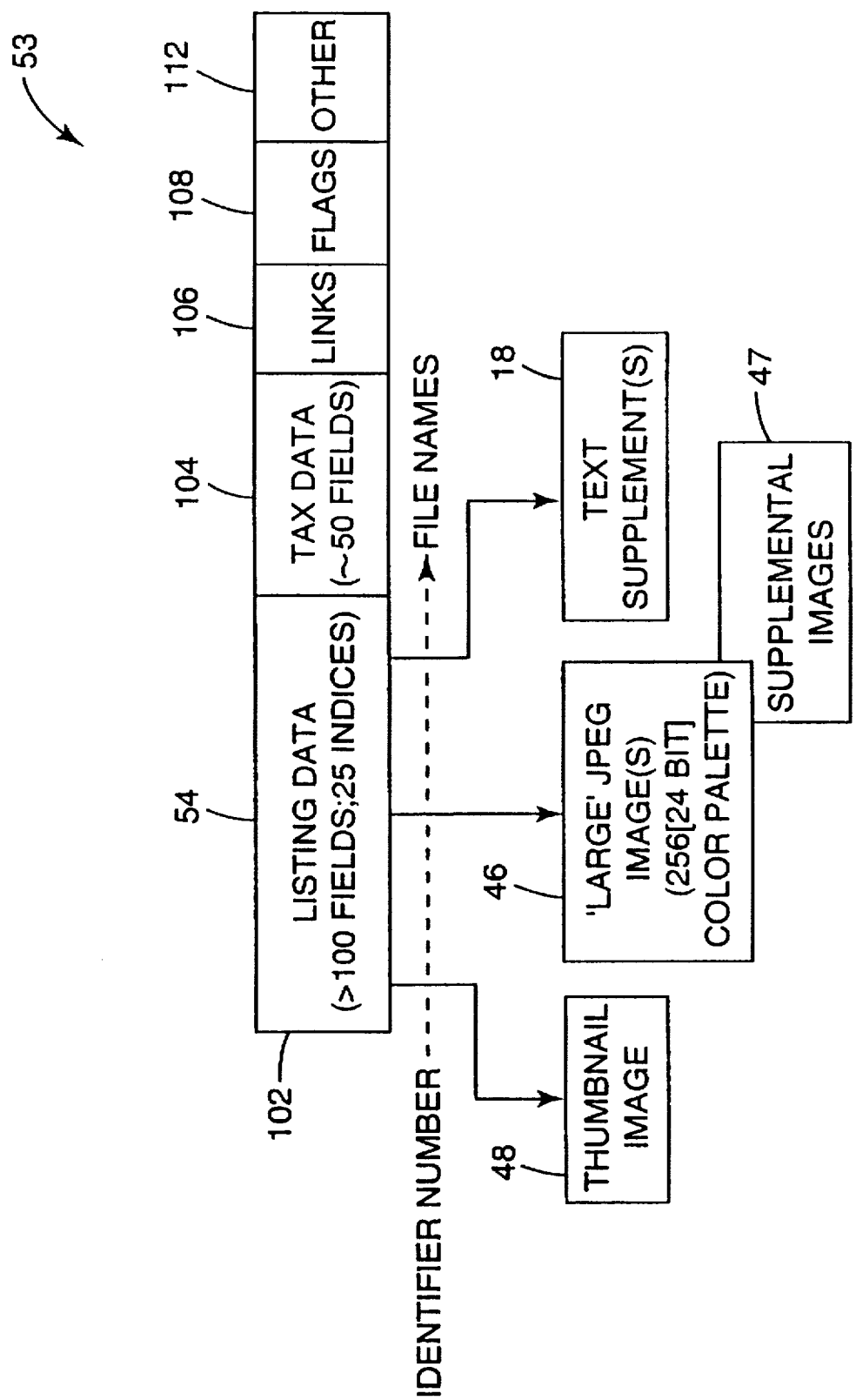
FIG. 7 is a diagram showing the compact disc data structure for each real estate property as stored on the master compact disc created in the formatting process of FIG. 1.

One database builder program 34 which may be utilized for such database generation is the batch processing software entitled "Dataware CD-Author" available from Dataware, Inc. The list of fields to index correspond to those fields which a user will be able to search by way of the search and display process, which is described further below. The database builder program 34 generates indexed tables 36 corresponding to each searchable field and data tables 38. The data tables 38 will include, as shown in FIG. 7, textual data records 54 for each listed property. The data record 54 will include listing data, which may include well over 100 fields, 25 of which may be indexed. In addition, the data record 54 includes tax data 104, links 106 for auxiliary program features, flags 108 for supplemental text and images as well as digital audio and video, and other information 112 for record formatting and for ease of processing across various computer systems using the ASCII coding system. It should be apparent to one skilled in the art that the number of index fields and other numbers of elements described herein can vary and that the present invention is not limited by any particular number of elements specified.

The database builder program 34 is utilized to preorganize the data in order to reduce the time required for the search and display process to retrieve data from the CD-ROM. Compact disc formatting software, such as disComposer™ available from TRACE, provides for transfer of the database from memory of computer system 120 to the master media 182 in master storage device 184, shown in FIG. 8. The disc formatting software organizes files for providing optimal placement on the master media 182. The master storage device 184 may be a large capacity hard disk, tape drive, re-writable optical drive, etc. and the master media is a replicable CD-ROM.

The computer system 120, such as that shown in FIG. 8, utilized in the compact disc format process 10 to perform the above described functions may be a computer system such as an EISA Bus, Intel™486 microprocessor driven system, Apple Macintosh™ Quadra 950 or similar 'high end' "desktop" computer system. The computer system should have at least 16 MBytes of RAM and 2 GBytes of disk memory for completing the above process and be configured to handle the large data volume efficiently for transfer of all the data without errors.

The computer system 120 also copies from memory to the master media 182 or master CD-ROM 50, image files 16 and supplemental text files 18, per the subdirectory process 40 as shown in FIG. 1. The formatting process for storage of these files to master CD-ROM 50 is described with reference to FIG. 6. For each property listed, and for which a data record 54 is created, a main image 90 and possibly supplemental images 91, 92 are copied to master CD-ROM 50, if such images are available. The number of images stored is only dependent upon the storage capacity and directory structure of the CD-ROM 50. The main image may be provided to the system as a compressed image or an uncompressed image. In any case, the multiple images 16 are compressed 42. In one embodiment of the invention, this compression, is performed in accordance with a JPEG standard subsystem which, for example, can reduce an image that occupies about 600 k bytes to an image, depending upon the colors involved, occupying about 40 k bytes. These compressed images are shown as main compressed image 46 and compressed supplemental images 47 in FIG. 6. Any compression and decompression described herein are performed with the use of compression utilities, such as LeadTools compression utilities available from Lead Technologies, Inc.

In accordance with the present invention, the main compressed image is decompressed at block 44 per a JPEG standard algorithm and then recompressed at block 45 in accordance with a compression method similar to a JPEG standard to produce a thumbnail image 48. The thumbnail image 48, which originally occupied about 600 k bytes in uncompressed form, occupies only about 2 k bytes as a thumbnail image 48. The thumbnail image 48 is, of course, a lesser resolution image than compressed images 46 and 47 when decompressed and displayed.

The compressed images, which include the compressed main image 46 and compressed supplemental images 47, the compressed thumbnail image 48 of the main image 90, and supplemental text 18, are copied to the master CD-ROM 50 under control of subdirectory structure creation process 49. Of course, thumbnail images could be made of supplemental images 91, 92 and any other images presented to compression block 42 and blocks 44, 45. The compressed images 46, thumbnail image(s) 48, compressed supplemental images 47, and text supplement 18 are copied to about 100 subdirectories, based on a hash algorithm. For example, the compressed images 46 may have the filename ./MLS/xx/ img/"listing number", the thumbnail image may have the filename ./MLS/xx/bmp/"listing number", and the text supplements may have the filename ./MLS/xx/supp/"listing number." The 'xx' in each of these filenames represent the subdirectory the various images and supplemental texts are stored to, and xx=00 to 99 based on a hash algorithm. The hash algorithm may be any hash algorithm which randomly places the images and/or text supplements in the 100 subdirectories. For example, the hash algorithm could be squaring each of the ones-complement of the ASCII code of each of the characters of the multiple listing property number, summing these values, and selecting the two least significant digits of that number as xx. This algorithm is given for example only, and any particular hash algorithm is satisfactory, as long as the algorithm provides for random placement in the 100 subdirectories. The multiple listing number is provided to the sub-directory structure creation block 49 via listing numbers file 86.

Shown in FIG. 7 is the CD-ROM stored data structure 53 for each listed real estate property. The data structure 53 for each property includes the data record 54 as previously discussed, the thumbnail image 48, the compressed main image 46, as well as any additional text supplements 18 and other supplemental images 47. The data record 54 of the data structure 53 is linked to the thumbnail image 48, compressed main image 46, and any other supplemental images 47 or text supplements 18 by way of the listing number or an identifier. By storing the thumbnail image 48, the main image 46, the supplemental text 18 and supplemental images 47 in subdirectories as a function of the listing number which provides the pointing means between the database and other stored data, the speed to access such data is increased during the search and display process as compared to opening and closing the databases.

In addition to thumbnail images, text supplements, the main image 46, and supplemental images 47, other content 26 can be copied to the master CD-ROM 50. For example, digital audio and compressed video data may also be linked to the data record 54 by listing number and copied to and stored in the subdirectories under a hash algorithm as a function of the listing number. Therefore, the present invention is not limited to the types of data and information described herein, but may include a multitude of other data types. The other content 26 may also be content with regard to how the system works, or in other words on-board training data. A menu feature of the run-time program 24 would be associated with the training data to allow the user to obtain training on the system.

In addition to the storage of the database, the supplemental text files 18 and the image files 16 per subdirectory creation program 40, run-time program 24 (to be described further below with regard to the search and display process) is also copied to master CD-ROM 50. More than one version of the run-time program 24 or portions thereof may be copied to the master CD-ROM 50. For example, the different run-time programs may be for use with different platforms, such as Macintosh, DOS, and Windows platforms. Further, such run-time programs may also be used with some or all of the data fields for the files.

The master CD-ROM 50 is then sent for replication 52 as is known to one skilled in the art and thus can be distributed to users. The run-time software 24 includes but is not limited to software utilities for decompression, operating system extensions for memory and display management, a database engine program, a search and display program, a graphics interface, and other executable routines necessary for the functioning of the search system as described below as would be apparent to one skilled in the art. In Windows™ these routines include: DLL's and VBX's; and with regard to the Macintosh™ they are generally referred to as resources.

With reference to FIGS. 8 through 13, search and display of data stored utilizing the formatting process described above and using an on-site computer system 120 shown in FIG. 8 shall be described. Computer system 120 may be a standard personal computer, such as an 486 processor based system which includes a computer unit 122 having a processor 124 and memory 126. The computer system 120 further includes a compact disc read-only memory (CD-ROM) drive 134, a display 132, keyboard 130, and mouse 128. The CD-ROM drive 134 is compatible with the CD-ROM replicated from CD-ROM master 50. The computer system 120 is able to load executable code of run-time program 24 to memory 126. Any computer system 120 can perform the search and display process as long as the computer system 120 includes a processor of sufficient clock speed, memory address range and display memory attributes to contain and process the volume of data presented. The executable code as indicated above includes at least the database engine, the user search and display software, decompression software for both decompressing the main image in accordance with the JPEG standard and the thumbnail image in accordance with the compression algorithm, and other user interface software such as that necessary for permitting use of mouse 128 and display controls 132.

Figure 9:
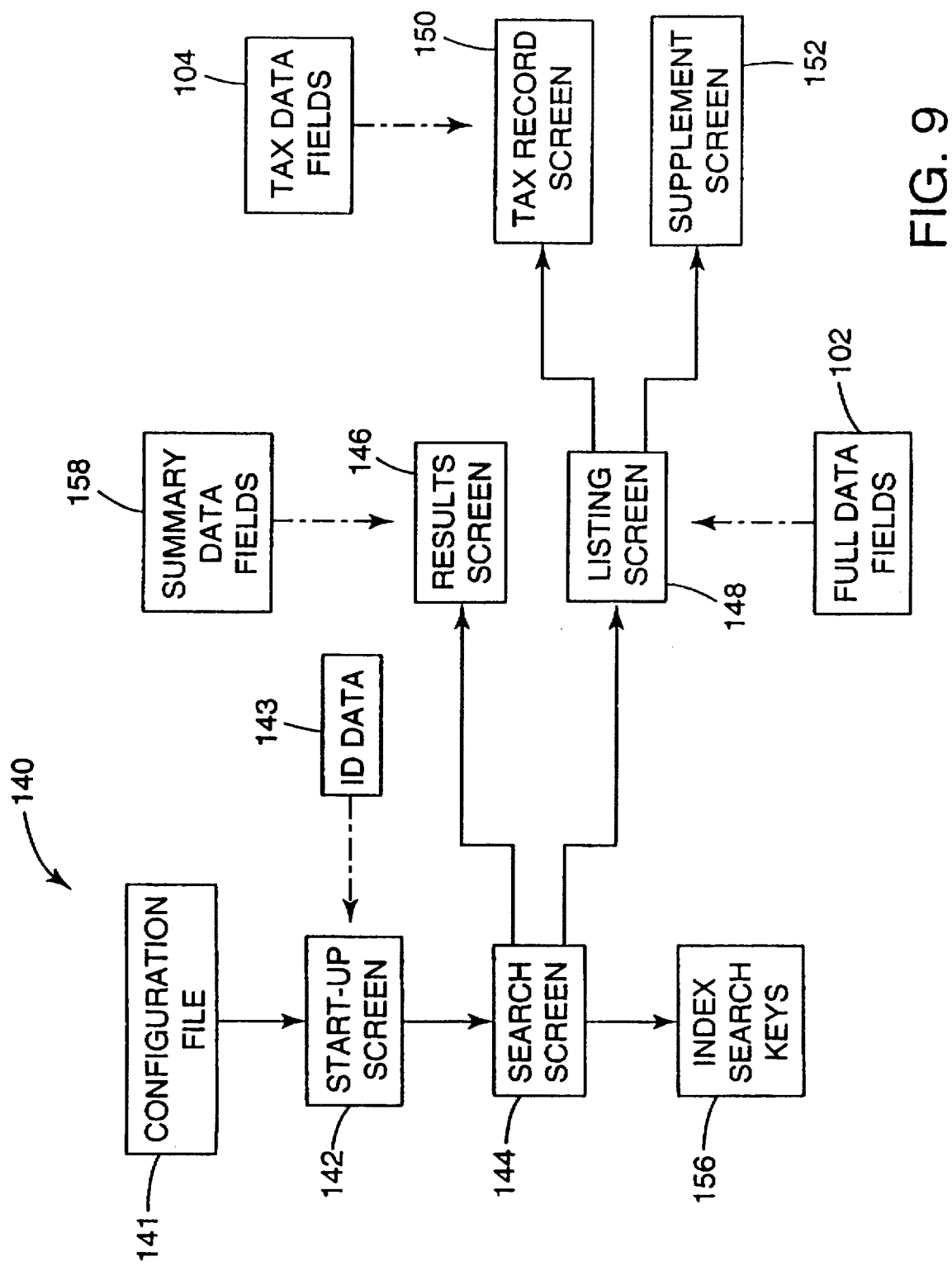
FIG. 9 is a diagram of the table driven program for searching and display of information stored per the formatting process of FIG. 1.

After the run-time program 24 is loaded into memory 126, table driven run-time program 24 proceeds through the search routine 140 as shown in the block diagram of FIG. 9. The startup screen 142 is utilized to initialize the system with proper identification 143 and bring up a search screen 144. The search screen 144 provides the interface for the user to define search queries as described below and then request the results of such search queries per the results screen 146. The grid type results screen 146 displays the results of the search when more than one property results from the search. If only one property results from the search, then the listing screen 148 provides for display of the compressed main image 46 and the listing data 102 for the property. When more than one property results from the query, then the thumbnail images and summary data fields for the properties are displayed. From the results screen 146, the listing screen 148 can be chosen for any of the resulting properties and the compressed main image 46 and the listing data 102 for the property selected is displayed thereon. Other supplemental screens can be selected from the listing screen 148 to view further detail regarding the property such as tax data fields 104 on tax record screen 150 or additional images 47 and text supplements 18 on supplement screen 152.

In further detail with regard to the search process, the startup screen 142 is utilized to open the configuration file 141 for the system and initialize the database stored on the CD-ROM in CD-ROM drive 134. The configuration file includes pointers or references to all the data on the CD-ROM to initialize the system, including the database such that the database engine can generate references to the information on the CD-ROM during a search as described below. The references of the configuration file 141 are utilized by the search and display program to reference data, such as the images 46–48, supplemental text 18, and other content 26, that is not referenced by the database engine. The configuration file 141 also determines network parameters, and other data structure characteristics. This allows for customization of databases using different data fields, object or property types, and other database information changes while utilizing the same search and display program.

Further, when the configuration file 141 is copied to a device such as a hard drive, or it references such an optional file on the hard drive, the configuration file can be updated to provide additional references to be used to locate updated data from another data source such as a hard drive or network. This allows updated information to be made available with the data previously available on the replicated CD-ROM from the replication process 52 without producing another CD-ROM with such updated information. For example, CD-ROM revisions with different properties listed due to buyer-seller transactions may be produced on a weekly basis. In between the revisions, updates could be provided from other data sources as described above with modification to the configuration file 141.

Figure 10:
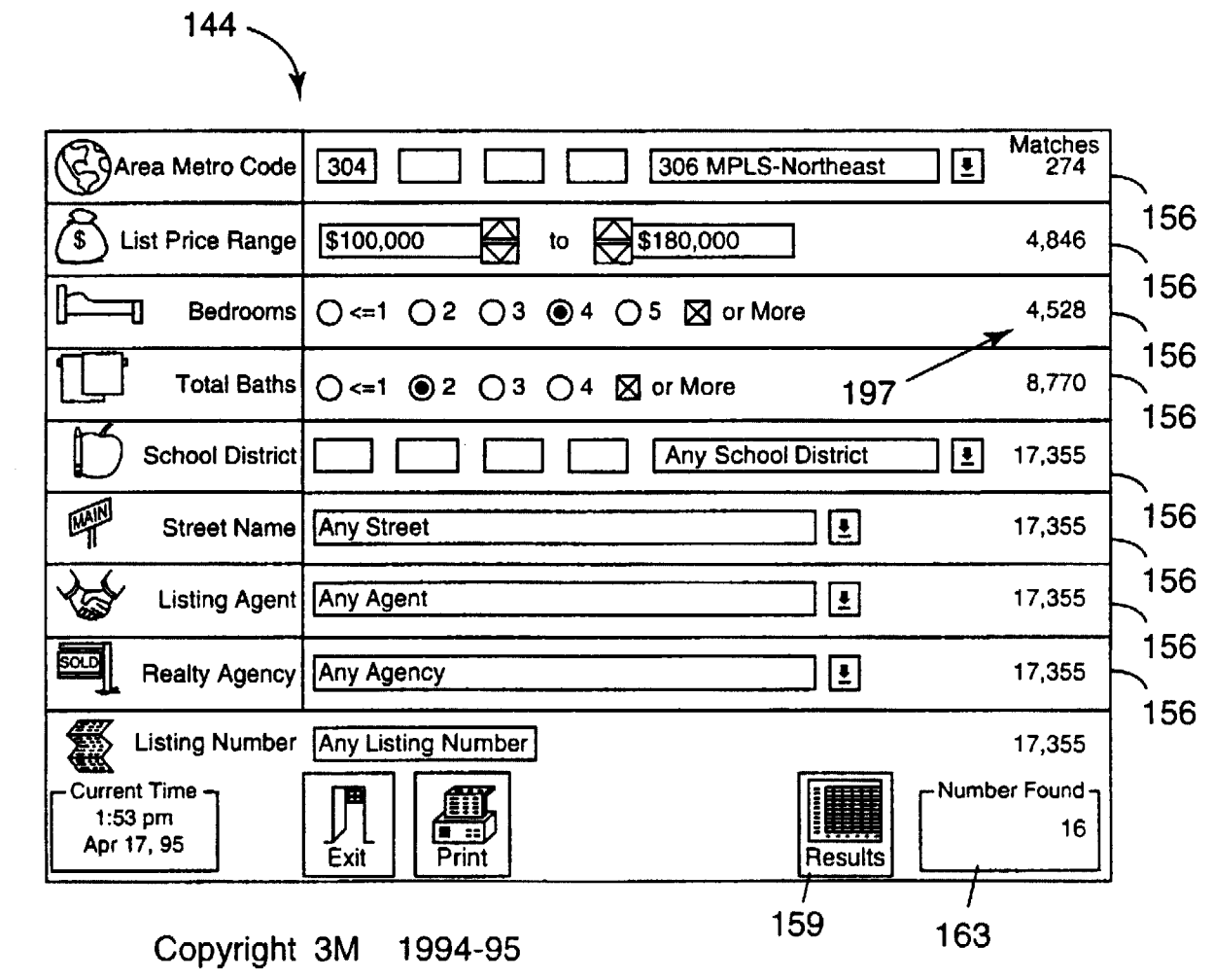

The user is then requested to select a continue command to bring up a search screen 144, like that shown in FIG. 10. Search screen 144 includes index search keys or index bars 156 for creating a search query with respect to each index search key and a composite query shown by the a count in the Number Found block 163 which includes all the individual search queries. Each index search key or index bar 156 corresponds to one of the index tables 36 of the database created by database builder 34 and includes an iconic cue, a parameter description such as price, an option or search query selection portion for defining the search query for a particular parameter such as a price range of $100,000 to $180,000, and a count section to identify to the user the number of matches for that particular key or bar from the entire database resulting from the search query.

The user may be able to select the particular index search keys it wishes to utilize in defining the composite search query. In the preferred embodiment, the index search keys are limited in number and correspond to the number of searchable fields per the index tables 36. However, the present invention is not limited to any specific number of searchable fields or any particular parameter to be searched. Each index search key 156 includes icons for the parameter being queried and various options for the parameter. Such options may include the use of spin lists for easy selection by the user. For example, one of the index search keys is for the parameter of Price Range, another for the number of Bedrooms, and another for the School District. The options for the search query can be easily selected by utilizing the up-down arrows for the price, inputting a specific number for the number of bedrooms, and selecting an option from the spin list for the school district. The spin list when chosen by selection of the arrow in the school district index search key produces a list of various school districts to choose from. The icons of the index search keys 156 allow for selection of the parameter to be queried.

As the user selects each index search key 156 and creates a search query for the particular parameter associated with the index search key, the user search and display software commands the database engine to search the index table of the database corresponding to the search parameter for real estate properties which meet the search query defined by the user. For example, the user may define the search query for the price parameter as $100,000 to $200,000. The number of matches determined by the database engine would then be displayed by the user search and display software to the user in the match section 197 of the index search key 156. The user then would continue and define another search query for another parameter and so forth until the user has chosen the search queries for the parameters which the user wishes to utilize in the overall composite search query. Upon completion of defining a search query for each selected parameter per the index search keys, a composite total of real estate properties meeting all the user defined search queries is displayed to the user in Number Found block 163 each time an individual search query is changed. In general terms, counts are shown for the search query of each parameter and a composite total count for properties which satisfy all the user's search queries is provided in Number Found block 163. By selectively altering search queries and viewing the counts and composite total, the user can focus the search such that a limited number of total hits occurs and a meaningful result is obtained.

Figure 11:
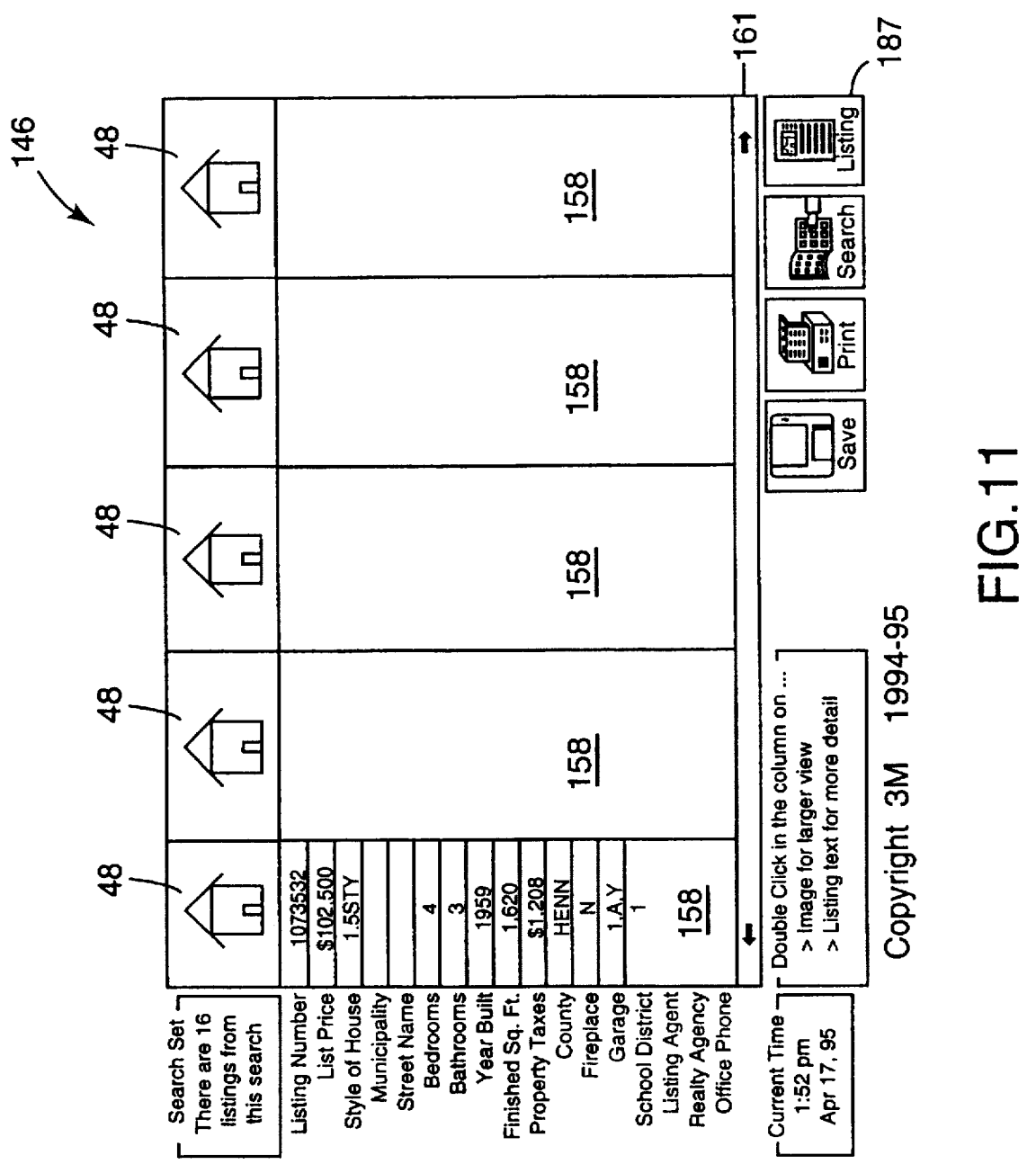
Figure 12:
FIG. 12 is a diagram generally showing the listing screen of FIG. 9.

After the user has completed entering the composite query, the user provides a command utilizing the keyboard or the mouse 128, such as selecting the Results block 159, to display the results of the query. If the composite query resulted in only one hit, then the listing screen 148 as shown in FIG. 12 displays the main image 46 and the listing data 102 of the data record 54 corresponding to the property identified by the one hit query. If, however, the composite search query as shown in the Number Found block 163 results in more than one listing property which meets the criteria defined for the parameters, a results screen 146 as shown in FIG. 11 is utilized to display the results.

After a composite search query has been defined, the user search and display software commands the database engine to generate a table of pointers or references indicating where on the CD-ROM information concerning the properties resulting from the composite search is located. This includes references to where the main compressed image is located, where the summary data fields are located, where the supplemental text and supplemental images are located, and any other information with regard to the resulting properties are located. The information concerning one particular property is all tied to the listing number or identifier of the property. When the user enters a command to display the results, the database engine performs a single fetch to load into RAM of memory 126, the compressed thumbnail image 48 and summary data fields 158 as chosen per user-defined input 32 to database builder 34 when the database was created. The compressed thumbnail images 48 for the properties identified in the search are decompressed by the decompression software as is known to one skilled in the art which performs decompression similar to a JPEG standard. The decompressed thumbnail image 48 is displayed with the summary data fields 158 as shown in FIG. 11.

By displaying the decompressed thumbnail image rather than displaying a decompressed main image 46, the time required to load the image and decompress the image substantially reduces the time necessary to get the user a quick view of the images resulting from the composite search query. After the user has viewed the results screen 146, the user may choose to select one of the records to be displayed in further detail on listing screen 148 by selecting the Listing block 187 on the results screen 146. Further, the user may walk through all the properties resulting from the composite search query by using arrow bar 161. Because all the results for composite search have been loaded, the time for display of such resulting properties is minimal.

When one of the properties on results screen 146 is selected, the data base engine retrieves, using the table of references generated previously, the compressed main image 46 and the entire listing data 102 of the data record 54 for display on the listing screen 148 as shown in FIG. 12. It should be apparent that not all the listing data need be displayed and the fact that the entire listing data is shown should not be taken as limiting the scope of the claims of present application. The compressed main image 46 is decompressed by the decompression software in accordance with JPEG standard prior to display.

From the listing screen 148, the user may view further information by selecting to go to supplemental screens 152 or a tax record screen 150. For example, by selecting the Taxes block 105, tax data fields 104 of data record 54 are loaded and displayed for that particular listed piece of property. Other supplements can also be selected for display, such as image supplements or text supplements stored in the subdirectories by selecting the Supplement block 107. When the user is done examining the results of a search, the user may terminate the search and display process or proceed with additional searches in the same manner as described above. Block 201 is used to return to the results screen whereas blocks 202 and 203 are used to 'step' through the results set per indicator 204.

The user may proceed between screens for viewing results from a composite search. However, the search and display process is a funnel type search wherein the location of information for properties resulting form an initial composite search are referenced and any further searching is performed with respect to that referenced information. An expansion of the search can only be accomplished by returning to the search screen and redefining the composite search.

While the invention has been described in connection with what is presently considered to be the preferred embodiment, the appended claims are not to be limited to the disclosed embodiments, but on the contrary, are intended to cover all modifications, variations, and/or equivalent arrangements which retain any of the novel features and advantages of this invention. By way of nonlimiting example, the invention can be utilized for catalogs of products for sale.

What is claimed is:

1. A method of transforming and storing data to create a pre-recorded storage media, the method comprising the steps of:

providing image data for a plurality of objects, each object associated with a corresponding identifier of a plurality of identifiers;

providing at least one group of textual data records for the plurality of objects associated with corresponding identifiers, each group of textual data records including data records having corresponding same or different map records;

providing a definition map for each group of textual data records defining a common format for transforming the corresponding map records to a common table mapped format;

formatting and aligning the data records of each group of textual data records using the transformed corresponding map records to the common table mapped format;

merging the formatted and aligned data records of the at least one group of textual data records into a merged data file;

generating a database from the merged data file and storing the database on a master storage media, the database including data tables having a textual file for each object, each textual file having a plurality of data fields and being associated with a corresponding identifier, the database further including a plurality of index tables at least in part corresponding to searchable data fields of the plurality of data fields of the textual files;

compressing the image data for each of the plurality of objects resulting in at least one compressed image for each object;

storing the at least one compressed image for each object to a plurality of storage subdirectories of the master storage media as a function of the identifier corresponding to the object;

storing a program for manipulating the stored image data and textual data on the master storage media with the database and the storage subdirectories; and duplicating the master storage media.

2. The method according to claim 1, wherein the method further comprises the step of decompressing and recompressing a compressed image for each object resulting in a thumbnail image for each object.

3. The method according to claim 2, wherein the storing the at least one compressed image step includes the step of randomly storing the at least one compressed image and the thumbnail image to the plurality of storage subdirectories on the master storage media.

4. The method according to claim 2, further comprising the steps of:

providing an index bar interface for at least one searchable data field of the plurality of data fields, each index bar interface for allowing a user to select options for a search parameter corresponding to the at least one searchable data field resulting in a defined search query;

searching the index table corresponding to the at least one searchable data field for objects satisfying the search query;

generating a table of references to a storage media duplicated from the master storage media indicating the position of textual and image data for objects satisfying the search query;

displaying a count of objects satisfying the search query;

retrieving image data and textual data for all of the objects satisfying the search query, the retrieved image data including the thumbnail image and certain summary data fields of the textual file having a plurality of data fields for each object; and decompressing the thumbnail image and displaying the decompressed thumbnail image with the certain summary data fields for at least two objects of the all of the objects satisfying the search query.

5. The method according to claim 4, further including the steps of:

selecting one of the at least two objects;

retrieving a substantial number of the data fields of the textual file and the at least one compressed image of the selected object; and decompressing the at least one compressed image of the selected object and displaying the decompressed image with the substantial number of data fields of the textual file.

6. The method according to claim 5, further comprising the steps of retrieving supplemental textual data or images associated with the selected object and randomly stored in the storage subdirectories upon selection by the user when the decompressed at least one compressed image and the substantial number of data fields for the selected object are displayed.

7. The method according to claim 4, wherein a plurality of index bar interfaces are provided and further wherein the method further includes the step of displaying a composite result count of objects satisfying search queries defined for all of the search parameters corresponding to the plurality of index bar interfaces.

8. The method according to claim 4, wherein the generating step further includes the step of generating references to additional storage media indicating the position of additional data.

9. The method according to claim 8, wherein the additional data includes updated textual and image data for the objects.

10. A method for search, retrieval and display of data using a computer with a media read apparatus for communication with the computer, the method comprising the steps of:

providing a pre-recorded database on storage media which is accessible utilizing the computer and media read apparatus, the pre-recorded database including a plurality of textual files corresponding to a plurality of objects, each textual file having a plurality of text fields and being associated with an identifier corresponding to one of the plurality of objects, the prerecorded database further having a plurality of indexed tables, each indexed table corresponding to a searchable data field of the plurality of text fields;

providing pre-recorded compressed image data for one or more objects of the plurality of objects stored on the storage media as a function of the corresponding identifier, the compressed image data including at least one compressed image and a compressed thumbnail image of the compressed image;

providing a table driven program on the storage media, the program operable using the computer for performing the steps of:

displaying a plurality of interfaces, each displayed interface of the plurality of interfaces corresponding to one of the indexed tables, and wherein each displayed interface allows a user to define a search query for a search parameter associated with one of the searchable data fields corresponding to one of the indexed tables;

searching each of the indexed tables for objects satisfying the search query defined for the search parameter associated with the searchable data field corresponding to the indexed table being searched;

generating a table of references to the storage media indicating the position of textual and image data for objects resulting from the searching step;

displaying with each displayed interface a count of objects satisfying the search query defined using the displayed interface;

displaying with the plurality of interfaces a composite count of objects satisfying all of the search queries defined using all of the displayed interfaces;

retrieving the compressed thumb nail image and certain summary data fields of the textual file for all of the objects of the composite count; and decompressing the compressed thumbnail image and displaying the decompressed thumbnail image with the certain summary data fields for at least two objects of all of the objects of the composite count.

11. The method according to claim 10, further including the steps of:

selecting one of the at least two objects;

retrieving at least a substantial number of the data fields of the textual file and the compressed image of the selected object; and decompressing the compressed image of the selected object and displaying the decompressed image with the substantial number of data fields of the textual file.

12. The method according to claim 11, further comprising the steps of retrieving supplemental textual data or images associated with the selected object and stored on the storage media upon selection by the user when the decompressed image and the substantial number of data fields for the selected object are displayed.

13. The method according to claim 10, wherein the plurality of interfaces includes a plurality of index bar interfaces, each index bar interface including an icon for selection by a user to initiate definition of a search query for the index table corresponding to the index bar interface, a search query definition portion, and a count portion for displaying the count of objects satisfying the search query defined using the search query portion.

14. The method according to claim 13, wherein the count portions of the plurality of interfaces are aligned with a composite count portion for display of the composite count of objects satisfying the search queries defined for all of the displayed index bar interfaces.

15. A computer implemented data searching system using a computer having a processor and an optical media read apparatus connected to the computer for communication with the processor thereof, the system comprising:

pre-recorded optical storage media operable with the optical media read apparatus under control of the computer and table-driven program means, the pre-recorded optical storage media for storing a database including a plurality of textual files corresponding to a plurality of objects, each textual file having a plurality of data fields and being associated with an identifier corresponding to one of the plurality of objects, the database further having a plurality of indexed tables, each indexed table corresponding to a searchable data field of the plurality of data fields, the pre-recorded optical storage media further for storing compressed image data for one or more objects of the plurality of objects in a plurality of subdirectories as a function of the identifiers, the compressed image data including at least one compressed image and a compressed thumbnail image of the compressed image; and the table-driven program means prerecorded to the optical storage media including:

means for displaying a plurality of index bar interfaces, each index bar interface of the plurality of index bar interfaces corresponding to and displayed based on one of the indexed tables, and wherein the means for displaying includes means for allowing a user to define a search query for a search parameter associated with one of the searchable data fields which corresponds to one of the indexed tables;

means for searching each of the indexed tables for objects satisfying the search query defined for the search parameter associated with the searchable data field corresponding to the indexed table being searched;

means for generating a table of references to the pre-recorded optical storage media indicating the position of textual and image data for objects resulting from the search query;

means for displaying with each displayed interface a count of objects satisfying the search query defined using the displayed interface;

means for displaying a composite count of objects satisfying all of the search queries defined using all of the displayed interfaces;

means for retrieving the compressed thumbnail image and certain summary data fields of the textual file for all of the objects of the composite count; and means for decompressing the compressed thumbnail image and displaying the decompressed thumbnail image with the certain summary data fields for at least two of the objects of the composite count.

16. The system according to claim 15, wherein the table-driven program means further includes:

means for retrieving a substantial number of data fields of the textual file and the at least one compressed image of an object selected from the at least two of the objects using the table of references; and means for decompressing the at least one compressed image of the selected object.

17. The system according to claim 15, wherein the generating means includes means for generating references to additional storage media indicating the position of additional data.

18. The system to claim 17, wherein the additional data includes updated textual and image data for the objects and the additional storage media includes at least one of a hard drive and a network.

19. The system according to claim 15, wherein each index bar interface includes an icon for selection by a user to initiate definition of a search query for the index table corresponding to the index bar interface, a search query definition portion, and a count portion for displaying the count of objects satisfying the search query defined using the search query portion.

20. The method according to claim 41, wherein the count portions of the plurality of index bar interfaces are aligned with a composite count portion for display of the composite count of objects satisfying the search queries defined for all of the displayed index bar interfaces.

21. A method of transforming and storing property data to create a pre-recorded storage media, the method comprising the steps of:

providing image data for a plurality of properties, each property associated with a corresponding listing number of a plurality of listing numbers;

providing at least a first group of property listing textual data records for the plurality of properties associated with corresponding identifiers and a second group of tax data textual records for the plurality of properties, the first group of property listing textual data records including property data records having corresponding same or different property map records and the second group of tax data textual records including tax data records having corresponding same or different tax map records;

providing a property definition map defining a common format for transforming the corresponding property map records to a common property table mapped format;

providing a tax definition map defining a common format for transforming the corresponding tax map records to a common tax table mapped format;

formatting and aligning the property data records of the group of property listing textual data records using the transformed corresponding property map records to the common property table mapped format and formatting and aligning the tax data records of the group of tax textual data records using the transformed corresponding tax map records to the common tax table mapped format;

merging the formatted and aligned property data records and tax data records into a merged data file;

generating a database from the merged data file and storing the database on a master optical disc, the database including data tables having a textual file for each property, the textual file having a plurality of data fields and is associated with a corresponding listing number, the database further including a plurality of index tables at least in part corresponding to searchable data fields of the plurality of data fields of the textual files;

compressing the image data for each of the plurality of properties resulting in at least one compressed image for each property;

randomly storing the at least one compressed image for each property to a plurality of image storage subdirectories on the master optical disc as a function of the listing number; and storing a program for manipulating the stored image data and textual data on the master optical disc with the database and the image storage subdirectories, the master optical disc being replicable.

22. The method according to claim 21, wherein the method further comprises the steps of:

decompressing and recompressing a compressed image for each property resulting in a compressed thumbnail image for each property; and randomly storing the compressed thumbnail image for each property to the plurality of image storage subdirectories on the master optical disc as a function of the listing number.

23. The method according to claim 22, further comprising the steps of:

providing a plurality of index bar interfaces, each index bar interface corresponding to one of the searchable data fields and for allowing a user to select options for a search parameter of the one of the searchable data fields resulting in a defined search query;

searching the index tables corresponding to the searchable data fields for properties satisfying the search queries defined for the plurality of index bar interfaces;

generating a table of references to an optical disc replicated from the master optical disc indicating the position of the text and image data for properties resulting from searching the index tables;

displaying a count of properties resulting from searching of the index tables;

retrieving image data and textual data of all the properties resulting from the search of the index tables, the retrieved image data including the compressed thumbnail image and certain summary data fields of the textual file having a plurality of data fields for each property;

decompressing the thumbnail image and displaying the decompressed thumbnail image with the certain summary data fields for at least two properties;

selecting one of the at least two properties;

retrieving at least a substantial number of the data fields of the textual file and the at least one compressed image of the selected property; and decompressing the at least one compressed image of the selected property and displaying the decompressed image data with the substantial number of data fields of the textual file.

24. The method according to claim 23, further comprising the steps of retrieving supplemental textual data or images associated with the selected property and randomly stored in the subdirectories as a function of the listing number upon selection by the user when the decompressed at least one compressed image and the substantial number of data fields for the selected property are displayed.

25. The method according to claim 23, wherein the generating step further includes the step of generating references to additional storage media indicating the position of additional data.

26. The method according to claim 25, wherein the additional data includes updated textual and image data for the properties.

27. A method for search, retrieval and display of property data using a computer with an optical media read apparatus for communication with the computer, the method comprising the steps of:

providing a pre-recorded database on optical media which is accessible utilizing the computer and the optical media read apparatus, the pre-recorded database including a plurality of textual files corresponding to a plurality of properties, each textual file having a plurality of data fields and being associated with a listing number corresponding to one of the plurality of properties, the pre-recorded database further having a plurality of indexed tables, each indexed table corresponding to a searchable data field of the plurality of data fields;

providing pre-recorded compressed image data for one or more properties stored in a plurality of subdirectories on the optical media as a function of the listing number, the compressed image data including at least one compressed image and a compressed thumbnail image of the compressed image;

providing a table driven program on the storage media, the program operable using the computer for performing the steps of:

displaying a plurality of index bar interfaces, each index bar interface corresponding to one of the indexed tables and wherein each displayed index bar interface allows a user to define a search query for a search parameter associated with one of the searchable data fields corresponding to one of the indexed tables;

searching each of the indexed tables for properties satisfying the search query defined for the corresponding index bar interface;

generating a table of references to the optical media indicating the position of textual and image data for properties resulting from the searching step;

displaying with each displayed index bar interface a count of properties satisfying the search query defined using the index bar interface;

displaying a composite count of properties satisfying all of the search queries defined using all of the displayed index bar interfaces;

retrieving the compressed thumbnail image and certain summary data fields of the textual file for each property of the composite count; and decompressing the compressed thumbnail image and displaying the decompressed thumbnail image with the certain summary data fields for at least two of the properties of the composite count.

28. The method according to claim 27, further including the steps of:

selecting one of the at least two properties;

retrieving at least a substantial number of the data fields of the textual file and the compressed image of the selected property using the table of references; and decompressing the compressed image of the selected property and displaying the decompressed image data with the substantial number of data fields of the textual file.

29. The method according to claim 28, further comprising the steps of retrieving supplemental textual data or images

19 associated with the selected object and randomly stored in the subdirectories as a function of the listing number upon selection by the user when the decompressed image and the substantial number of data fields for the selected property are displayed.

30. The method according to claim 27, wherein the generating step further includes the step of generating references to additional storage media indicating the position of additional data.

31. The method according to claim 30, wherein the additional data includes updated textual and image data for the properties.

32. A computer implemented property data searching system having a computer with a processor and an optical media read device connected to the computer for communication with the processor thereof, the system comprising:

pre-recorded optical storage media operable with the optical media read device under control of the computer and table-driven program means, the pre-recorded optical storage media for storing a database including a plurality of textual files corresponding to a plurality of properties, each textual file having a plurality of data fields and being associated with a listing number corresponding to one of the plurality of properties, the database further having a plurality of indexed tables, each indexed table corresponding to a searchable data field of the plurality of data fields, the pre-recorded optical storage media further for storing compressed image data for one or more properties of the plurality of properties in a plurality of subdirectories as a function of the listing numbers, the compressed image data including at least one compressed image and a compressed thumbnail image of the compressed image; and the table-driven program means pre-recorded on the optical storage media including:

means for displaying a plurality of index bar interfaces, each index bar interface corresponding to one of the plurality of indexed tables, and wherein the means for displaying includes means for allowing a user to define a search query for a search parameter associated with one of the searchable data fields corresponding to one of the indexed tables;

means for searching each of the indexed tables for properties satisfying the search query defined using the index bar interface corresponding to the indexed table being searched;

means for generating a table of references to the pre-recorded optical media indicating the position of textual and image data for properties resulting from the search queries;

means for displaying with each displayed index bar interface a count of objects satisfying the search queries defined using the displayed index bar interface;

means for displaying a composite count of properties resulting from the search queries defined using all of the displayed index bar interfaces;

means for retrieving the compressed thumbnail image and certain summary data fields of the textual file for each property of the composite count; and means for decompressing the compressed thumbnail image and displaying the decompressed thumbnail image with the certain summary data fields for at least two of the properties of the composite count.

33. The system according to claim 32, further including:

means for retrieving a substantial number of data fields of the textual file and the at least one compressed image

20 of a property selected from the at least two of the properties using the table of references; and means for decompressing the at least one compressed image of the selected property.

34. The system according to claim 32, wherein the generating means includes means for generating references to additional storage media indicating the position of additional data.

35. The system according to claim 34, wherein the additional data includes updated textual and image data for the properties and the additional storage media includes at least one of a hard drive and a network.

36. A pre-recorded program storage media readable by a media read apparatus under control of a computer, tangibly embodying a program executable to perform property data searching, the pre-recorded program storage media comprising:

a database including a plurality of textual files corresponding to a plurality of properties, each textual file having a plurality of data fields and being associated with a listing number corresponding to one of the plurality of properties, the database further having a plurality of indexed tables, each indexed table corresponding to a searchable data field of the plurality of data fields, the pre-recorded storage media further for storing compressed image data for one or more properties of the plurality of properties in a plurality of subdirectories as a function of the listing numbers, the compressed image data including at least one compressed image and a compressed thumbnail image of the compressed image; and table driven program means including:

means for causing the display of a plurality of index bar interfaces, each index bar interface corresponding to one of the plurality of indexed tables, and wherein the means for displaying includes means for allowing a user to define a search query for a search parameter associated with one of the searchable data fields corresponding to one of the indexed tables;

means for causing a search of each of the indexed tables for properties satisfying the search query defined using the index bar interface corresponding to the indexed table being searched;

means for causing the generation of a table of references to the storage media indicating the position of textual and image data for properties resulting from the search queries;

means for causing display with each displayed index bar interface a count of objects satisfying the search query defined using the displayed index bar interface;

means for causing display of a composite count of properties satisfying the search queries defined for all of the displayed index bar interfaces;

means for causing the retrieval of the compressed thumbnail image and certain summary data fields of the textual file for each property of the composite count; and means for causing the decompression of the compressed thumbnail image and causing the display of the decompressed thumbnail image with the certain summary data fields for at least two of the properties of the composite count.

37. The pre-recorded program storage media according to claim 36, further comprising:

means for causing the retrieval of a substantial number of data fields of the textual file and the at least one compressed image of a property selected from the at least two of the properties; and means for causing the decompression of the at least one compressed image of the selected property and causing the display of the decompressed image with the substantial number of data fields of the textual file.

* * * * *

UNITED STATES PATENT AND TRADEMARK OFFICE
CERTIFICATE OF CORRECTION

PATENT NO.: 5,781,773
DATED: July 14, 1998
INVENTOR(S): Thomas R. Vanderpool, Craig K. Lenz, TJ Parro, John D. Threlfall, Brian T. Vanderpool It is certified that error appears in the above-identified patent and that said Letters Patent is hereby corrected as shown below:

Col. 4, Line 21, "however" should read -- However --

Col. 4, Line 50, "process" should read -- process 30 --

Col. 5, Line 5, "map" should read -- .map --

Col. 6, Line 25, "postamble" should read -- postable --

Col. 16, Line 13, "to" should read -- according to --

Col. 16, Line 24, "41" should read -- 19 --

Col. 19, Line 53, "queries" should read -- query --

Abstract, Line 5, delete "therefrom"

Signed and Sealed this

Twenty-third Day of March, 1999

Attest:

Q. TODD DICKINSON

*Attesting Officer*            *Acting Commissioner of Patents and Trademarks*